(12) United States Patent
Liu et al.

(10) Patent No.: US 10,750,307 B2
(45) Date of Patent: Aug. 18, 2020

(54) CROSSTALK CANCELLATION FOR STEREO SPEAKERS OF MOBILE DEVICES

(71) Applicant: Hewlett-Packard Development Company, L.P., Spring, TX (US)

(72) Inventors: Wensen Liu, San Diego, CA (US); Sunil Bharitkar, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/603,260

(22) PCT Filed: Apr. 14, 2017

(86) PCT No.: PCT/US2017/027820
§ 371 (c)(1),
(2) Date: Oct. 7, 2019

(87) PCT Pub. No.: WO2018/190880
PCT Pub. Date: Oct. 18, 2018

(65) Prior Publication Data
US 2020/0045490 A1 Feb. 6, 2020

(51) Int. Cl.
| | | |
|---|---|---|
| *H04S 7/00* | (2006.01) |
| *H04B 1/3827* | (2015.01) |
| *H04R 3/14* | (2006.01) |
| *H04R 5/02* | (2006.01) |
| *H04R 5/04* | (2006.01) |
| *H04S 1/00* | (2006.01) |

(52) U.S. Cl.
CPC ........... *H04S 7/301* (2013.01); *H04B 1/3833* (2013.01); *H04R 3/14* (2013.01); *H04R 5/02* (2013.01); *H04R 5/04* (2013.01); *H04S 1/007* (2013.01); *H04R 2499/11* (2013.01)

(58) Field of Classification Search
CPC ....... H04S 7/301; H04S 1/007; H04B 1/3833; H04R 3/14; H04R 5/02; H04R 5/04; H04R 2499/11
See application file for complete search history.

(56) References Cited

U.S. PATENT DOCUMENTS

| | | |
|---|---|---|
| 5,870,484 A | 2/1999 | Greenberger |
| 6,928,168 B2 | 8/2005 | Kirkeby |

(Continued)

FOREIGN PATENT DOCUMENTS

| | | |
|---|---|---|
| JP | 2010016573 A | 1/2010 |
| WO | WO-2016033358 A1 | 3/2016 |

OTHER PUBLICATIONS

Ole Kirkeby et al, "Crosstalk Cancellation network by Fast De-Convoution".

(Continued)

*Primary Examiner* — Mark Fischer
(74) *Attorney, Agent, or Firm* — HPI Patent Department

(57) ABSTRACT

Described herein is a technology related to a mobile device with a pair of stereo speakers. The mobile device has an orientation detection system that detects the orientation of the mobile device and a crosstalk cancellation system that performs crosstalk cancellation with complementary cardioid beams in response to the detected orientation of the mobile device. The mobile device also has an audio system that emits complementary cardioid sound beams from the speakers.

15 Claims, 7 Drawing Sheets

(56) References Cited

U.S. PATENT DOCUMENTS

| | | |
|---|---|---|
| 8,144,902 B2 | 3/2012 | Johnson |
| 8,229,143 B2 | 7/2012 | Bharitkar et al. |
| 2006/0045294 A1 | 3/2006 | Smyth |
| 2007/0110265 A1* | 5/2007 | Kirkeby .................. H04R 5/04 381/300 |
| 2008/0219485 A1 | 9/2008 | Kantola |
| 2011/0002487 A1 | 1/2011 | Panther et al. |
| 2012/0099733 A1 | 4/2012 | Wang et al. |
| 2012/0128160 A1 | 5/2012 | Kim et al. |
| 2015/0189455 A1 | 7/2015 | Donaldson |

OTHER PUBLICATIONS

Ralph Glasgal & Robin Miller, RACE (Recursive Ambiophonic Crosstalk Elimination).

Settel, Z., Sound Source Localization and Its Use in Multimedia Applications, < http://sheefa.net/zack/publications/ASA_98.pdf >.

Tatsumi Nakajimi et al, "A simple method of calculating the interaural cross-correlation function for a sound field", JASA, V.93(2), pp. 885-891, 1993.

\* cited by examiner

CROSSTALK CANCELLATION FOR STEREO SPEAKERS OF MOBILE DEVICES

BACKGROUND

Mobile devices, such as smartphones, phablets, and tablet computers, are ubiquitous. Because they are mobile, these devices are small and thin. Despite that, most mobile devices are equipped with at least one audio speaker.

For many reasons, the mobile device is frequently the most convenient and personal music source. That is, people often play music or other high-quality audio using the speakers of their mobile device. Because of this, many mobile device have a pair of stereo speakers. These stereo speakers offer a much richer and immersive audio experience than was offered with a single speaker device.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Described herein are technologies to facilitate a wider stereo image of a pair of stereo speakers of a mobile device and, in some instances, a reduction in crosstalk between the speakers. While mobile devices may have a pair of stereo speakers, a human listener rarely experiences an actual stereo effect because of the limited spacing between the speakers of the devices and uncertainty of the orientation of those speakers relative the listener's ears. Unlike large stereo systems at home, mobile devices are small, and the stereo speakers are usually micro-speakers with a limited spacing therebetween.

Indeed, the mobile device has a relatively small stereo image and produces crosstalk. Stereo speakers produce a stereo image that has a "sweet spot" formed by focal point between the speakers. The sweet spot is where a person is fully capable of hearing the full stereo audio mix. Usually, stereo speakers' positions and the sweet spot form an equilateral triangle. Consequently, the sweet spot is five to eight inches away for most mobile devices. This is not a comfortable or convenient listening position.

Another common issue with stereo speakers is audible crosstalk. With stereo headphones, the sounds from left and right channels are isolated from each other. Unlike that, the sound from each speaker of a pair stereo speakers of a mobile device travels to both ears of the human listener. To reduce the audible crosstalk, the listener may have to hold the mobile device very closely to their face.

The stereo speakers of the technologies described herein form complementary cardioid beams under defined conditions. An example of a defined condition includes a calculation of the present horizontal spacing between the speakers of the mobile device based on a determination of the relative orientation (e.g., portrait vs. landscape) of the device. Alternatively or in addition, the technologies described herein utilizes a crosstalk canceller for virtual speaker-based spatial rendering.

With the technology described herein, a user of a mobile device with stereo mini-speakers may listen to the sounds emitted from the mini-speakers with a wider stereo image than is achieved without this technology. Alternatively or in addition, the user hears the stereo image with a minimal crosstalk between the stereo speakers.

Unlike stereo home theater where speakers are placed on the left and right side relative to the listener, a user can position or hold mobile devices in either portrait or landscape orientations. The mobile devices can also be positioned somewhere in between the two orientations.

Figure 1A:
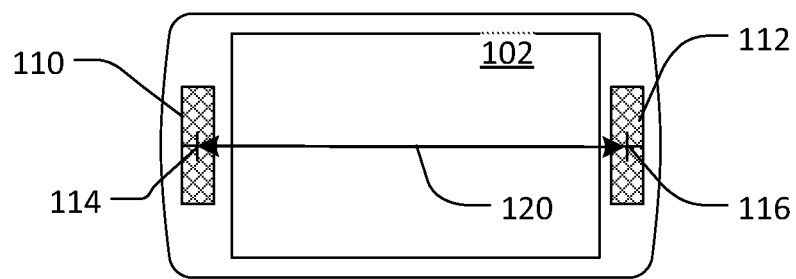
FIGS. 1A-1C illustrates several example mobile devices in various orientations in accordance with the technologies described herein.
Figure 1B:
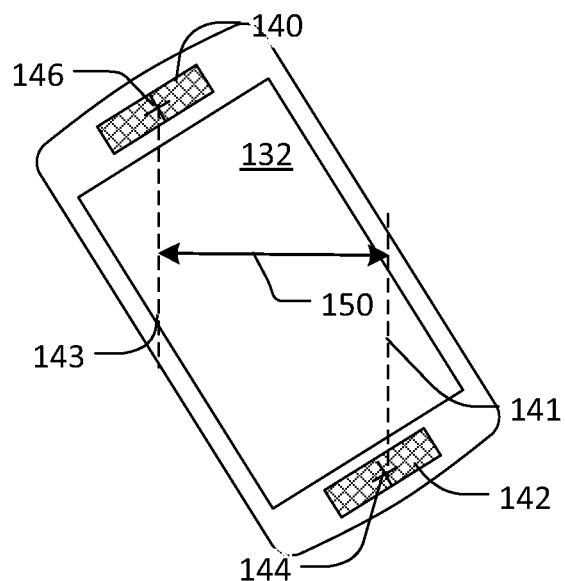
Figure 1C:
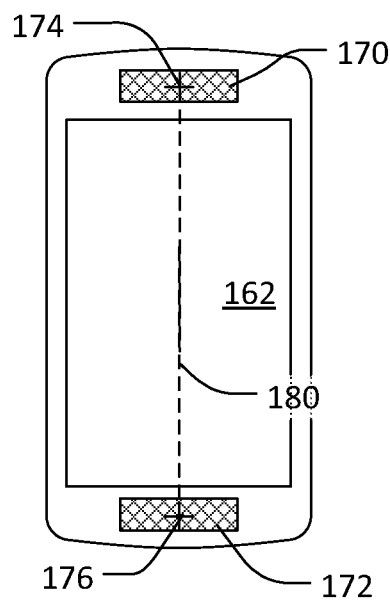

FIGS. 1A-1C shows three examples of how a mobile device may be handled or positioned. These example scenarios represent mobile devices in differing orientations. The mobile devices shown here are smartphones and/or tablets, which are examples of a mobile device with stereo speakers in accordance with the technology described herein.

The FIG. 1A includes an example mobile device 102 in the landscape mode or orientation. More specifically, the device 102 is shown in speaker-aligned landscape orientation. The mobile device 102 includes a pair of stereo speakers: a nominally left speaker 110 and a nominally right speaker 112. The left speaker 110 has a cross 114 marking its center point, and the right speaker 112 has a cross 116 marking its center point. Double-headed arrow 120 represents a horizontal spacing or distance between the pair of speakers.

As depicted, the horizontal spacing may be measured from the center point of each speaker when the stereo speakers are designed with direct front porting. In other implementations, the horizontal spacing may be measured from the center of the porting edge of each speaker.

As depicted, the speakers 110 and 112 of the mobile device 102 are positioned on the edge of the device, symmetrically along the device's longest axis, and away from the shortest axis. With this arrangement, the horizontal spacing (as represented by the arrow 120) is the maximum horizontal spacing achievable.

A maximum horizontal spacing is between five and ten inches is common for mobile devices. Dimensions of the particular mobile device that incorporates the technology described herein determines the actual maximum horizontal spacing. In some implementations, the value of the maximum horizontal spacing is stored in the memory of the mobile device.

The determined horizontal distance between the pair of stereo speakers is a maximum horizontal distance between the speakers when the detected orientation of the mobile device is a speaker-aligned landscape. The speaker-aligned landscape is an orientation of the mobile device where each of the speakers of the pair of stereo speakers is aligned on a substantially horizontal line with a maximum horizontal distance therebetween.

The FIG. 1B includes an example mobile device 132 in a mode or orientation that is somewhere in between landscape and portrait. The mobile device 132 includes a pair of stereo speakers: a nominally left speaker 140 and a nominally right speaker 142. The left speaker 140 has a cross 144 marking its center point, and the right speaker 142 has a cross 146 marking its center point.

A vertical dashed line 141 projects from the cross 144 of the left speaker 140. Another vertical dashed line 143 projects from the cross 146 of the right speaker 142. Double-headed arrow 150 represents a horizontal spacing or distance between vertical dashed lines of the speakers.

As depicted in FIG. 1B, the mobile device 132 is between horizontal (i.e., landscape) and vertical (i.e., portrait) orientation. As such, the horizontal spacing (as represented by the double-headed arrow 150) is less than the maximum horizontal spacing but more than zero.

The FIG. 1C includes an example mobile device 162 in a portrait mode or orientation. More specifically, the device 162 is shown in speaker-aligned portrait orientation. The mobile device 162 includes a pair of stereo speakers: a nominally left speaker 170 and a nominally right speaker 172. The left speaker 170 has a cross 174 marking its center point, and the right speaker 172 has a cross 176 marking its center point.

A vertical dashed line 180 connects cross 174 of the left speaker 170 to the cross 176 of the right speaker 172. Because the mobile device 162 is in a portrait orientation, there is zero horizontal spacing between the speakers. When in the portrait orientation as shown by FIG. 1C, the stereo image is lost. No speaker is actually on the left or the right.

The determined horizontal spacing between the pair of the stereo speakers is a minimum horizontal spacing (e.g., zero) between the speakers when the detected orientation of the mobile device is a speaker-aligned portrait. The speaker-aligned portrait is an orientation of the mobile device where each speaker of the stereo speakers is aligned on a substantially vertical line with no horizontal spacing therebetween.

For illustration purposes, the signal from the top speaker is treated as the nominal left channel while the signal from the bottom speaker is treated as a nominal right channel when the mobile device is in portrait orientation. Different processing schemes should be applied depending on the device orientation.

It is common for a mobile device comes equipped with three-dimensional (i.e., 3D) accelerometer and gyroscope. Consequently, the mobile device is capable of sensing its orientation relative to gravity.

Figure 2:
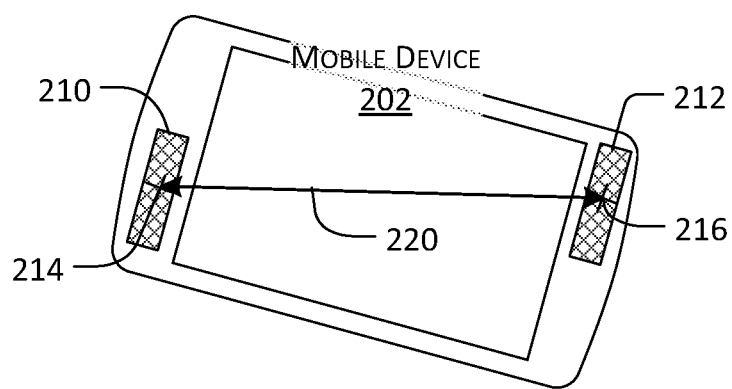
FIG. 2 illustrates an example mobile device in a speaker-aligned landscape orientation in accordance with the technologies described herein.

FIG. 2 depicts an example orientation of another mobile device. FIG. 2 shows an example mobile device 202 in a speaker-aligned landscape orientation. The mobile device 202 has stereo speakers that are not aligned along its longest axis. The mobile device 202 includes a pair of stereo speakers: a nominally left speaker 210 and a nominally right speaker 212. The left speaker 210 has a cross 214 marking its center point, and the right speaker 212 has a cross 216 marking its center point. Double-headed arrow 220 represents a horizontal spacing or distance between the pair of speakers.

As depicted, the mobile device 202 is skewed relative to top and bottom of the drawing page. However, the double-headed arrow 220 is shown as being horizontal relative to the top and bottom of the drawing page. Indeed, the horizontal spacing shown in FIG. 2 is the maximum horizontal spacing achievable in this type of mobile device. Consequently, this orientation is called landscape. Herein, the label of the landscape is designated when the mobile device is oriented in such a way that the pair of speakers has their maximum horizontal spacing therebetween. Conversely, the label of the portrait is designated when the mobile device is oriented in such a way that the pair of speakers has their minimum (e.g., zero) horizontal spacing therebetween.

With an implementation disclosed herein, the detected orientation of the mobile device ranges from a speaker-aligned landscape to a speaker-aligned portrait. The speaker-aligned landscape is an orientation of the mobile device where each speaker of the stereo speakers is aligned on a substantially horizontal line with a maximum horizontal distance therebetween. The speaker-aligned portrait is an orientation of the mobile device where each speaker of stereo speakers is aligned on a substantially vertical line with no horizontal distance therebetween.

Herein, a substantially horizontal line is plus or minus five degrees from a line that is parallel to the gravitational horizon. Likewise, a substantially vertical line is plus or minus five degrees from a line that is perpendicular to the gravitational horizon.

Figure 3:
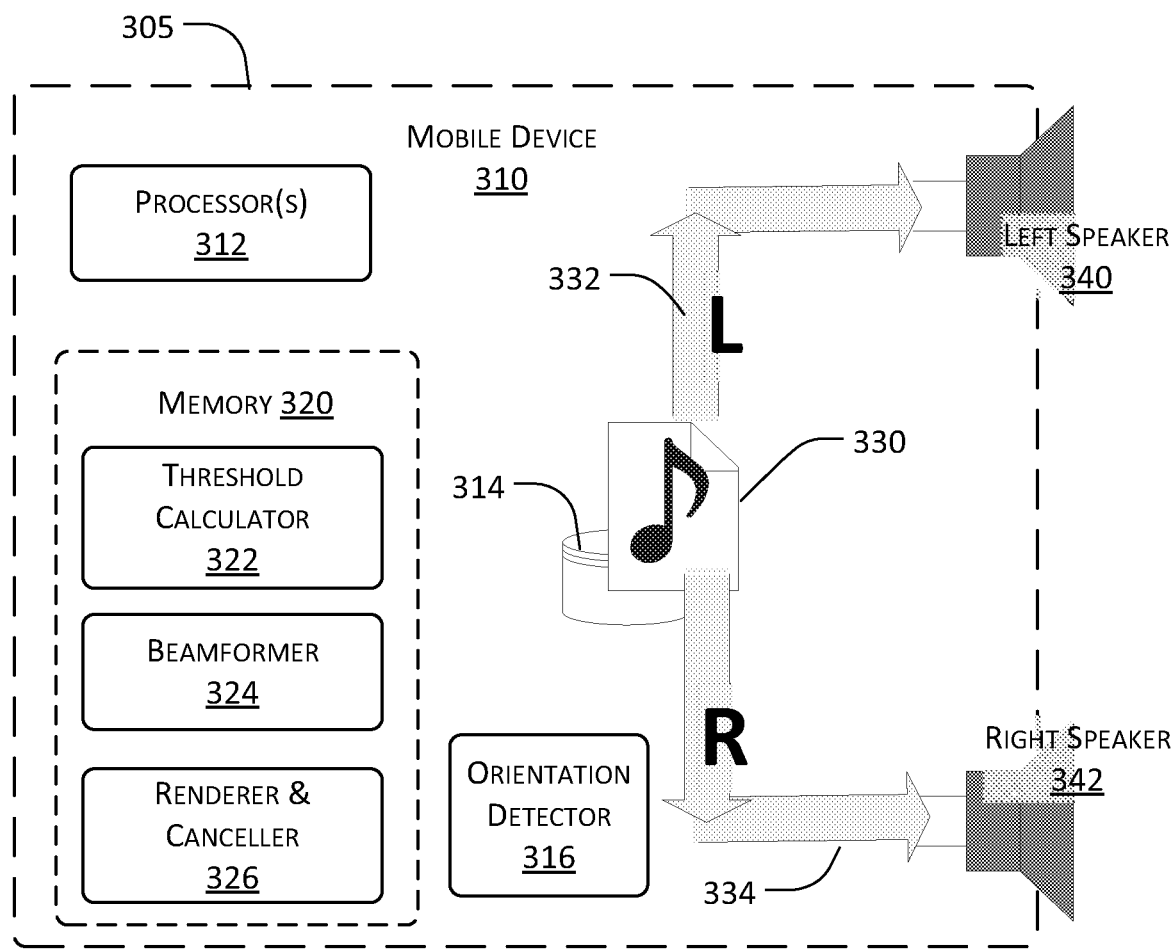
FIG. 3 shows a component diagram of an example mobile device in accordance with the technologies described herein.

FIG. 3 shows an example of a mobile device 310 that implements the technologies described herein. As depicted, the example mobile device 310 includes a housing 305, at least one processor 312, an audio storage system 314, an orientation detector 316, a memory 320, and an audio system that includes a pair of stereo speakers.

The audio storage system 314 is a primary or secondary memory that stores audio files 330 with stereo channels: nominally left channel 332 and nominally right channel 334. Alternatively, the audio storage system 314 may be connected to a communications network and stream music therefrom.

The audio system includes a nominally left speaker 340 and a nominally right speaker 342. By default, the left speaker 340 emits an audible sound signal based on receiving the nominally left channel 332. Similarly, by default, the right speaker 342 emits an audible sound signal based on receiving the nominally right channel 334.

The memory 320 stores sets of processor-executable instructions, such as a threshold calculator 322, a beamformer 324, and a virtual speaker-based stereo widening and crosstalk canceller 326. Alternatively, these functional components may be implemented as firmware or hardware only. Although depicted separately, the audio storage system 314 may be part of the memory 320.

The threshold calculator 322 calculates a threshold frequency that is based on a horizontal spacing between the speakers. To calculate this spacing, the threshold calculator 322 obtains the maximum horizontal spacing between the speakers, which is stored in the memory 320 and determines the orientation of the device with the aid of the orientation detector 316.

When the example mobile device 310 plays a music file (such as file 330) the frequencies below the calculated threshold frequency, the beamformer 324 produces complementary user-directed cardioid beams rather than their omnidirectional beams. These cardioid beams are formed for the frequencies below the calculated threshold frequency. This occurs when there is at least some horizontal spacing between the speakers.

For all frequencies above the threshold frequency, a virtual speaker based spatial rendering and crosstalk canceller 326 performs speaker-based crosstalk cancellation. The crosstalk canceller is discussed below.

Figure 4A:
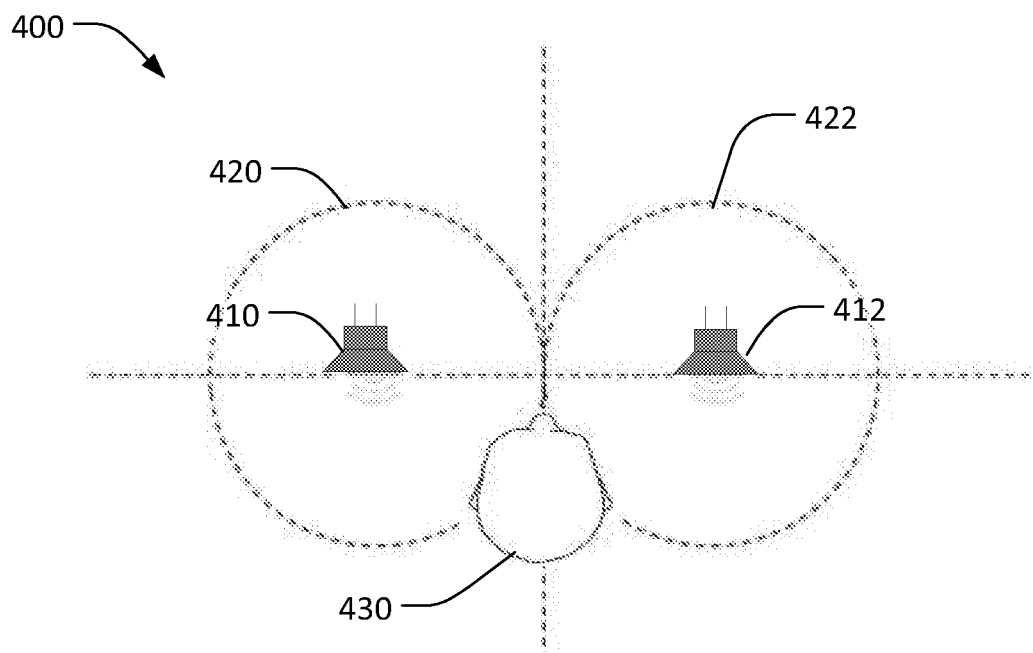
FIG. 4A is a simplified representation of omnidirectional acoustic beams formed by speakers of a mobile device.

FIG. 4A shows an example scenario 400 of a simplified depiction of acoustic beams formed by a pair of stereo mini-speakers from a mobile device. For this example scenario 400, presume that the each of the left mini-speaker 410 and the right speaker 412 in a stereo pair have the same performance characteristics. As depicted, each speaker emits its own omnidirectional acoustic beam 420 and 422 from each micro-speaker.

A top-plan view of a user's head 430 is position in the sweet spot of the stereo image. If the user's head is further back from the speakers, then the user does not the full stereo effect. Regardless, the user is able to hear crosstalk. That is, the user can hear the acoustic beam 422 from the right speaker 412 in the left ear, and the user can hear the acoustic beam 420 from the left speaker 410 in the right ear.

Figure 4B:
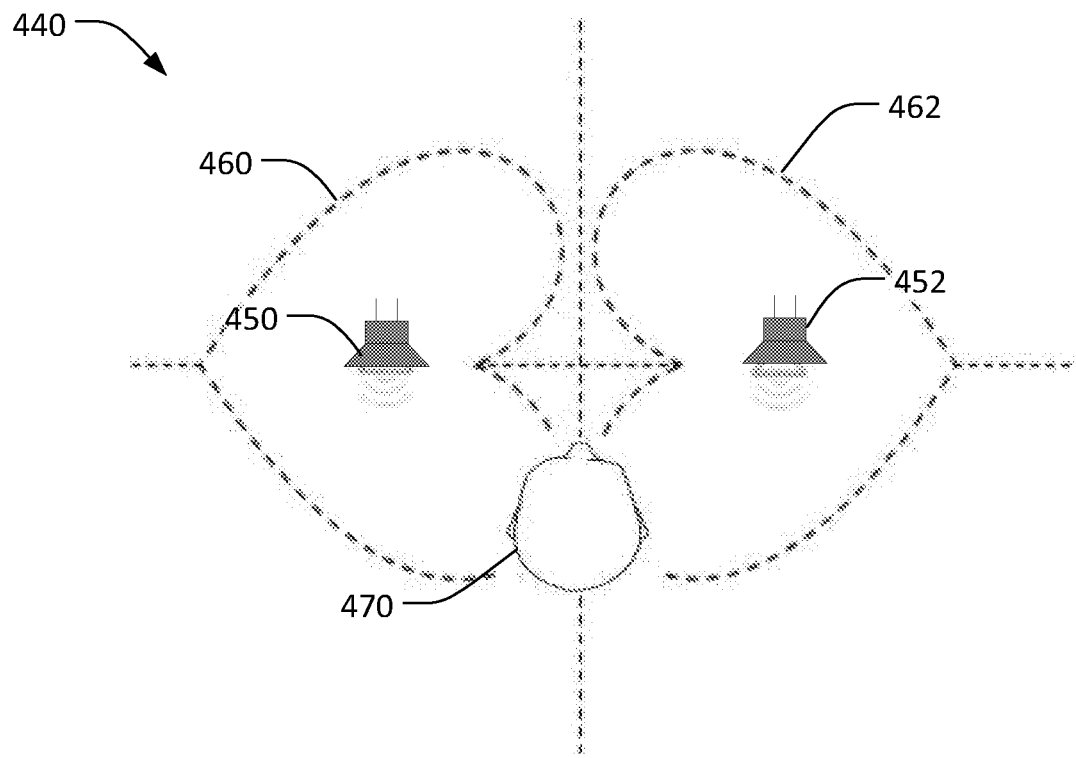
FIG. 4B is a simplified representation of cardioid acoustic beam formed by speakers of an example mobile device in accordance with the technologies described herein.

FIG. 4B shows an example scenario 440 of a simplified depiction of acoustic beams formed by a pair of stereo mini-speakers of a mobile device in accordance with the technologies described herein. For this example scenario 440, presume that the each of the left mini-speaker 450 and the right speaker 452 in a stereo pair have the same performance characteristics. As depicted, each speaker emits its own complementary user-directional cardioid acoustic beam 460 and 462 from each micro-speaker. The complementary cardioid sound beams are directed toward the opposite direction of the other channel and create a null toward the other channel.

A top-plan view of a user's head 470 is position in the sweet spot of the stereo image. This sweet spot (and the overall stereo image) is wider than with the omnidirectional beams. As depicted in FIG. 4B, the original left channel mostly reaches listener's left side and minimizes to the right side; likewise, the same effect applies to the original right signal. Thus the stereo image is widened, and crosstalk is reduced.

An implementation of the technology described herein form a complementary cardioid beam pattern like that shown in FIG. 4B by applying "+Left/−Left with delay" signal to "Left/Right" speakers. This generates the left cardioid beam 420 for left speaker 410. Likewise, applying "+Right/−Right with delay" signal to "Right/Left" speakers generates the right cardioid beam 422 for right speaker 422.

The threshold frequency (i.e., aliasing frequency) is calculated by dividing a speed of sound c by twice the determined horizontal spacing d. The calculated threshold frequency or aliasing frequency ($f_a$) is based on the following equation:

$$f_a = \frac{c}{2d} \qquad \text{Equation 1}$$

The time-delay of the other stereo channel includes an opposite signal of the other stereo channel with a calculated time delay.

Equation 1 below provides more details. For that equation, $L_1(t)$ and $R_1(t)$ are the original signals of left and right channels. The signals applied to Left/Right speakers are as follows $$L_2(t)=L_1(t)-R_1(t-t_d)$$

$$R_2(t)=R_1(t)-L_1(t-t_d) \qquad \text{Equation 2}$$

Where delay $t_d=d/c$ is the time lapse of sound traveling between stereo speakers, d is calculated horizontal spacing of the speakers, c is the speed of sound; $-L_1(t-t_d)$ and $-R_1(t-t_d)$ are the opposite signals with delay, respectively.

Figure 5:
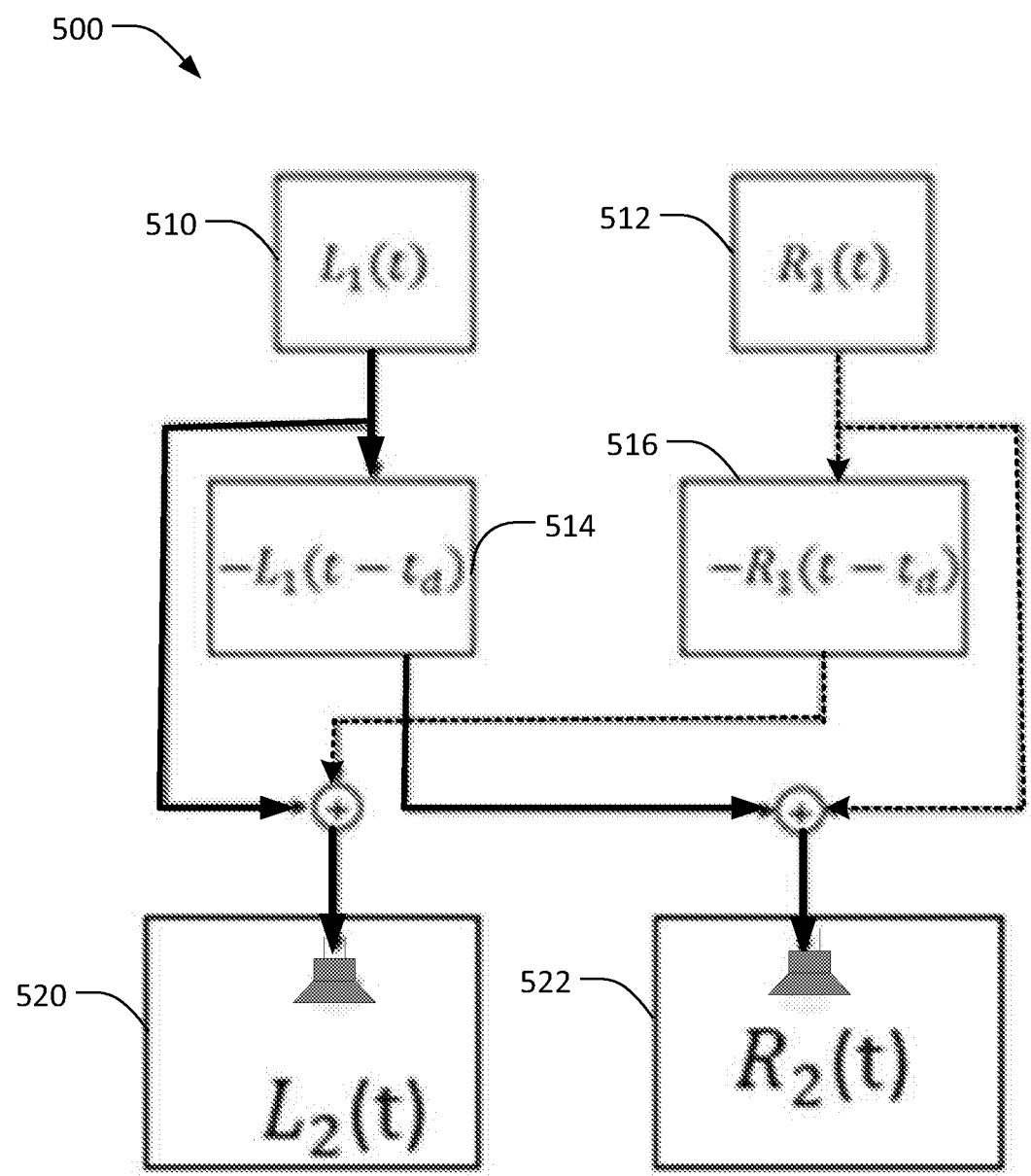
FIG. 5 shows an example signal flow for forming cardioid beams in accordance with the technologies described herein.

FIG. 5 illustrates a flow diagram of an example signal process 500 of the forming of a complementary acoustic cardioid beam in accordance with the technology described herein. The example process 500 utilizes equation 1 above.

Block 510 represents the original signal of the left channel: $L_1(t)$. Block 512 represents the original signal of the right channel: $R_1(t)$.

Block 514 represents the opposite ($-L_1(t-t_d)$) of the left channel with a delay for combining with the right channel of block 512. Block 516 represents the opposite ($-R_1(t-t_d)$) of the right channel with a delay for combining with the left channel of block 510.

Block 520 represents the modified left signal emitted by the left speaker to form the left complementary acoustic cardioid beam (like that shown by beam 460 in FIG. 4B). Block 522 represents the modified right signal emitted by the right speaker to form the right complementary acoustic cardioid beam (like that shown by beam 462 in FIG. 4B).

Without applying heavy signal processing, the two opposite orientated cardioid beams enlarge the stereo image, especially for the frequencies lower than the aliasing or threshold frequency.

Figure 6:
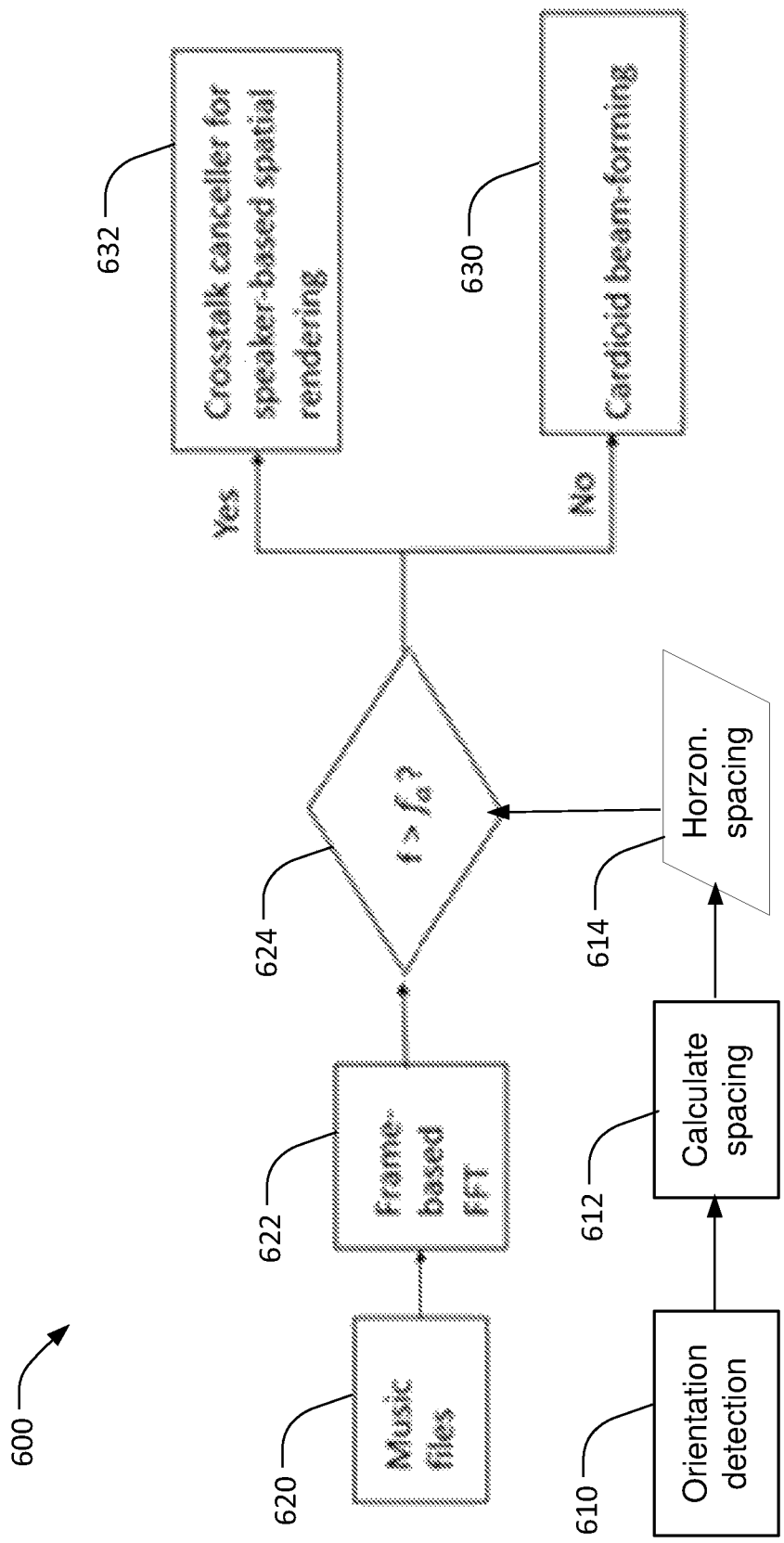
FIG. 6 is a flowchart of an example process in accordance with the technologies described herein.

FIG. 6 is a flow diagram illustrating an example process 600 that implements the techniques described herein. The example process 600 may be performed by, for example, mobile device 310. For illustration purpose, the example process 600 is described as being performed by an example mobile device.

At 610, the example mobile device detects the orientation of the example mobile device.

At 612, the example mobile device, based on the detected orientation, calculates a horizontal distance between a pair of stereo speakers of the example mobile device. Block 614 is that calculated horizontal spacing (d).

At 620, the example mobile device obtains an audio file, signal, or stream, such as music files. The file or stream may be acquired from a storage system and/or a memory. The audio file has a pair of stereo channels: a nominally left channel and a nominally right channel.

At 622, the example mobile device performs a frame-based fast Fourier transform (FFT) on the audio file, signal, or stream. The frequencies are changing from a portion of signal (e.g., frame) to another portion of signal. In other words, audio frequency in one frame may be less than aliasing frequency while the audio frequency in the next frame may be greater than the aliasing frequency.

At 624, the example mobile device calculating a threshold frequency based, at least in part, on a determined horizontal distance (e.g., block 614) between the pair of speakers. At 624, the example mobile device determines whether the audio signal includes frequencies below the calculated threshold frequency.

At block 630, for the frequencies that fall below the calculated threshold frequency, the example mobile device performs crosstalk cancellation with complementary cardioid beams. For this example process 600, this is accomplished by modifying each of the stereo channels to introduce a composite signal of each channel and a time delay from the other channel. Then, the example mobile device emits the complementary cardioid sound beams from the pair of speakers. One of the speakers produces sound based on one of the modified stereo channels while the other of the speakers produces sound based on the other of the modified stereo channels.

The actions of block 630 is performed when the calculated horizontal spacing is greater than zero. If the example mobile device is positioned in a portrait orientation, the horizontal spacing is zero. Thus, block 630 is not performed.

Figure 7:
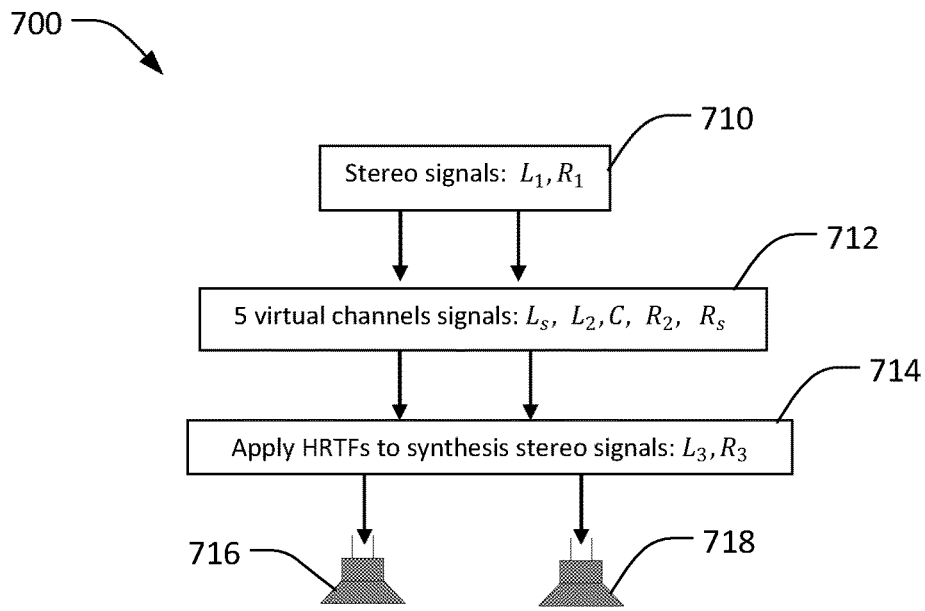
FIG. 7 is a flowchart of an example process to perform crosstalk cancellation for speaker-based spatial rendering in accordance with the technologies described herein.

At block 632, for the frequencies the fall above the calculated threshold frequency, the example mobile device performs some other crosstalk cancellation. For example, the example mobile device may perform the crosstalk canceller for speaker-based spatial rendering FIG. 7 shows a flowchart of an example process 700 for a crosstalk canceller for virtual speaker-based spatial rendering approach in accordance with a crosstalk matrix inversion. A crosstalk matrix is composed of inter-aural responses associated with the inter-aural cues that are loudspeaker angle dependent. Inter-aural responses include ipsilateral and contralateral responses. The listening position forms the angle of the loudspeakers relative to the listener.

The matrix can be constructed in the time-domain based on the convolution matrix of the ipsilateral and contralateral responses; or, in the frequency domain based on the Fourier transforms of the ipsilateral and contralateral responses. In short, the approach renders surround sound images with mobile device's stereo speakers. This approach is employed for frequencies above the threshold frequency. Accordingly, at least implementation of the technology described herein is a hybrid approach for performing crosstalk cancellation.

At 710, the example mobile device obtains original left/right stereo channels ($L_1$, $R_1$).

At 712, the example mobile device up-mixes the original stereo channels to five virtual surround sound channels: $L_s$, $L_2$, C, $R_2$, $R_s$.

Figure 8:
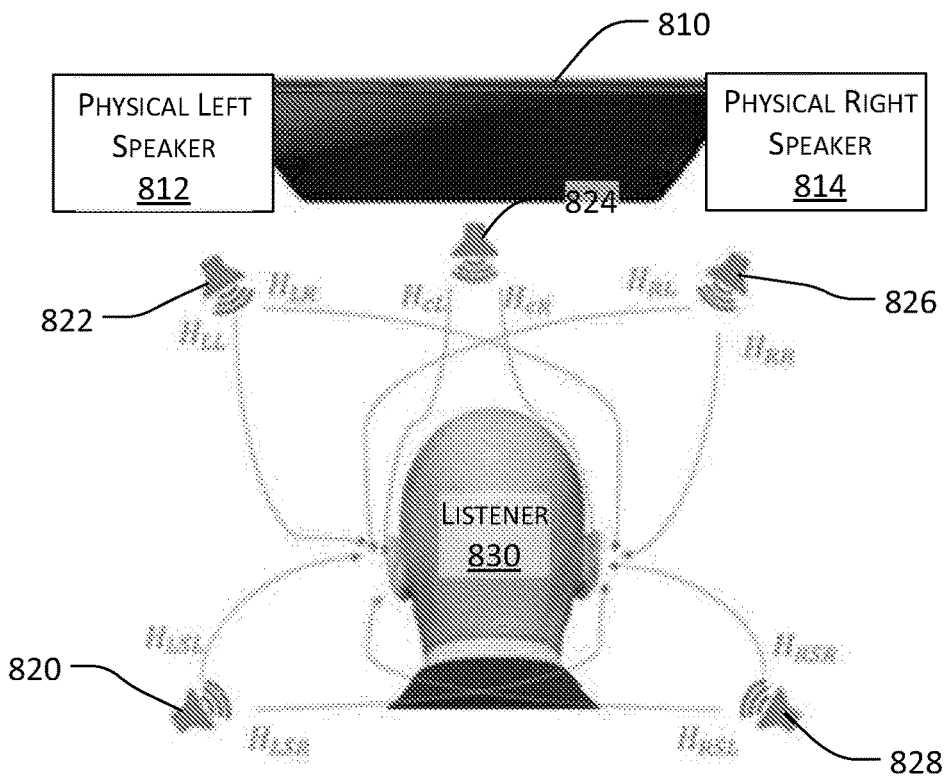
FIG. 8 illustrates an example arrangements of virtual speakers employed with the crosstalk cancellation for speaker-based spatial rendering in accordance with the technologies described herein.

FIG. 8 shows an example scenario 800 of the arrangement of the five virtual speakers if they actually existed physical space about a listener 830 of an example device 810 with a pair of physical stereo speakers: 812 and 814.

As depicted, virtual speaker 820 is $L_S$ (Left Surround), virtual speaker 822 is Left, virtual speaker 824 is Center, virtual speaker 826 is Right and virtual speaker 828 is $R_S$ (Right Surround). When the device is in landscape orientation, the Left/Right virtual channels may be chosen at ±30° while the Left Surround/Right Surround channels may be at ±110° directions relative to the human head median plane.

At 714, the example mobile device down-mixes the virtual surround sound channels. It does this by applying appropriate HRTFs (Head Related Transfer Functions) to synthesis back to stereo signals ($L_3$, $R_3$) to be playback with stereo speakers 716 and 718.

The orientation data is used to generate new HRTFs for immersive rendering. For example, in portrait orientation, the crosstalk canceller uses different angles for the filters as opposed to landscape orientation. Furthermore, as the human head rotates or translates relative to viewing screen interpolation of the crosstalk cancellation filters and the HRTFs can be used to stabilize the audio image perceived from the speakers.

The HRTFs (Head Related Transfer Functions) are applied to the five virtual speakers. The following are examples of which:

$H_{CL}$ and $H_{CL}$ are the HRTFs for center speaker to left and right ears, respectively;

$H_{LL}$ and $H_{LR}$ are the HRTFs for left speaker to left and right ears, respectively;

$H_{RL}$ and $H_{RR}$ are the HRTFs for right speaker to left and right ears, respectively;

$H_{LSL}$ and $H_{LSR}$ are the HRTFs for left-surround speaker to left and right ears, respectively;

$H_{RSL}$ and $H_{RSR}$ are the HRTFs for right-surround speaker to left and right ears, respectively.

This assumes that a human head is symmetrical and inline in the middle of the stereo speakers. Due to symmetrical nature, the above ten HRTFs can be reduced to 5 HRTFS as follows:

$$H_C=H_{CL}=H_{CR}$$

$$H_F=H_{LL}=H_{RR}$$

$$H_{FX}=H_{LR}=H_{RL}$$

$$H_S=H_{LSL}=H_{RSR}$$

$$H_{SX}=LSR=H_{RSL} \qquad \text{Equations 3}$$

Where:
$H_c(f)$—HRTF applied to the center channel, both L and R;
$H_F(f)$—HRTF applied to the front speaker to adjacent ear;
$H_{FX}(f)$—HRTF applied to the front speaker to opposite ear;
$H_S(f)$—HRTF applied to the surround speaker to adjacent ear;
$H_{SX}(f)$—HRTF applied to the surround speaker to opposite ear.

These Head Related Transfer Functions incorporate appropriate Inter-aural Time Difference (ITD) and Inter-aural Intensity Difference (IID) components based on virtual speakers' location relative to listener's ear.

Figure 9:
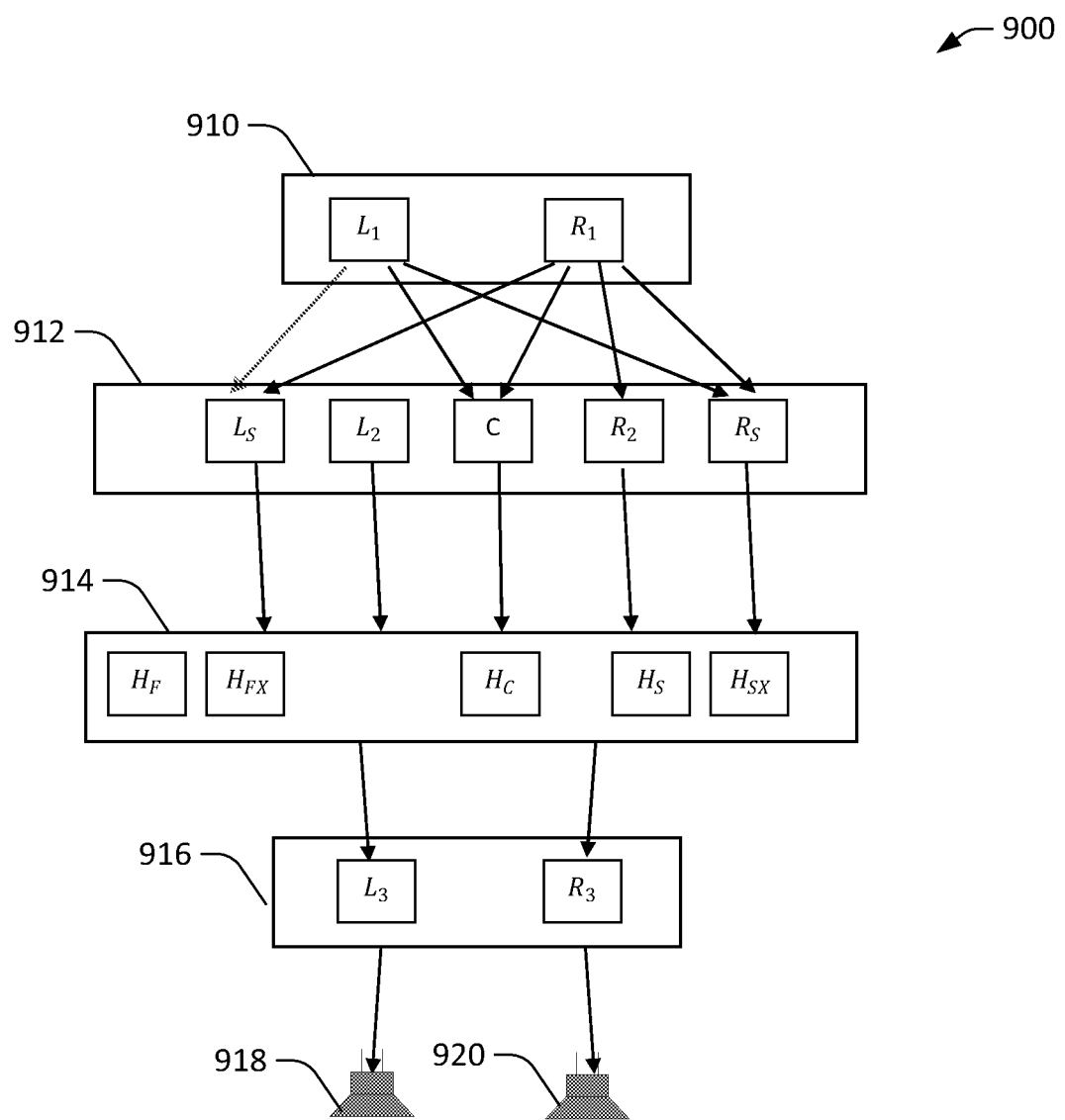
FIG. 9 is a flowchart of another example process to perform crosstalk cancellation for virtual speaker-based spatial rendering in accordance with the technologies described herein.

FIG. 9 shows the signal processing flow 900 of this up-mix and down-mix processing.

At 910, the example mobile device obtains the original stereo channels: $L_1$ and $R_1$.

At 912, the example mobile device up-mixes to produce five virtual signals: $L_S$ (Left Surround), Left (L), Center (C), Right (R), and $R_S$ (Right Surround).

At 914, the example mobile device performs HRTF processing.

At 916, the example mobile device down mixes to synthesized stereo signals: $L_3$ and $R_3$. A physical left speaker 918 of the example mobile device emits sounds based on the $L_3$ signal. A physical right speaker 920 of the example mobile device emits sounds based on the $R_3$ signal.

For the obtained audio signal with frequencies both above and below the calculated threshold frequency, both forms of the crosstalk cancellation are performed. That is, the crosstalk cancellation with complementary cardioid beams is performed for frequencies below the threshold frequency and the crosstalk cancellation with speaker-based rendering is performed for frequencies above the threshold frequency.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques" or "technologies," for instance, may refer to devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the blocks represent instructions stored on computer-readable storage media that, when executed by at least one processor, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

What is claimed is:

1. A method comprising:
based on a detected orientation of a mobile device, determining a horizontal spacing between a pair of the stereo speakers of the mobile device;
calculating a threshold frequency based, at least in part, on the determined horizontal spacing between the pair of speakers;
obtaining an audio signal having a pair of stereo channels;
determining that the audio signal includes frequencies below the calculated threshold frequency;
in response to the determination that the audio signal includes frequencies below the calculated threshold frequency, performing crosstalk cancellation with complementary cardioid beams, which includes:
modifying each of the stereo channels to introduce a composite signal of each channel and a time delay from the other channel;
emitting complementary cardioid sound beams from the pair of speakers, wherein one of the speakers produces sound based on one of the modified stereo channels while the other of the speakers produces sound based on the other of the modified stereo channels.

2. A method of claim 1, wherein the determined horizontal spacing between the pair of the stereo speakers is a maximum horizontal spacing between the speakers when the detected orientation of the mobile device is a speaker-aligned landscape, wherein the speaker-aligned landscape is an orientation of the mobile device where the stereo speakers are aligned on a substantially horizontal line with a maximum horizontal spacing therebetween.

3. A method of claim 1, wherein the threshold frequency is calculated by dividing a speed of sound by twice the determined horizontal spacing.

4. A method of claim 1, wherein the time-delay of the other stereo channel includes an opposite signal of the other stereo channel with a calculated time delay.

5. A method of claim 1, wherein the modifying includes calculating a time delay that is calculated by the determined horizontal spacing the stereo speakers divided by a speed of sound.

6. A method of claim 1, wherein the complementary cardioid sound beams are directed toward the opposite direction of the other channel and create a null toward the other channel.

7. A method of claim 1, in response to the determination that the audio signal includes frequencies above the calculated threshold frequency, performing crosstalk cancellation with virtual speaker-based rendering which includes for frequencies above the threshold frequency.

8. A mobile device comprising:
a housing;
a pair of stereo speakers in or on the housing;
an orientation detection system in the housing that is configured to detect an orientation of the mobile device;
an audio system in the housing that is configured to obtain an audio signal having a pair of stereo channels;
a crosstalk cancellation system in the housing that is configured to perform crosstalk cancellation with complementary cardioid beams based on the audio signal and in response to a detected orientation of the mobile device,
wherein the audio system is further configured to emit complementary cardioid sound beams from the pair of speakers.

9. A mobile device of claim 8, wherein an orientation of the mobile device ranges from a speaker-aligned landscape to a speaker-aligned portrait, wherein the speaker-aligned landscape is an orientation of the mobile device where each speaker of the stereo speakers are aligned on a substantially horizontal line with a maximum horizontal spacing therebetween and the speaker-aligned portrait is an orientation of the mobile device where each of the speakers of the pair of the stereo speakers are aligned on a substantially vertical line with no horizontal spacing therebetween.

10. A mobile device of claim 8, wherein the crosstalk cancellation performance includes:
based on a detected orientation, determine a horizontal spacing between the pair of the stereo speakers of the mobile device;
calculate a threshold frequency based, at least in part, on the determined horizontal spacing between the pair of speakers;
determine that the audio signal includes frequencies below the calculated threshold frequency;
in response to the determination that the audio signal includes frequencies below the calculated threshold frequency, modify each of the stereo channels to introduce a composite signal of each channel and a time delay from the other channel,
wherein one of the speakers are configured to produce sound based on one of the modified stereo channels while the other of the speakers produces sound based on the other of the modified stereo channels.

11. A mobile device of claim 10, wherein the threshold frequency is calculated by dividing a speed of sound by twice the determined horizontal spacing.

12. A non-transitory machine-readable storage medium encoded with instructions executable by a processor, the machine-readable storage medium comprising:

obtaining an audio signal having a pair of stereo channels;
obtaining a threshold frequency;
determining that the audio signal includes frequencies below the calculated threshold frequency;
in response to the determination that the audio signal includes frequencies below the threshold frequency, performing crosstalk cancellation with complementary cardioid beams of the frequencies of the audio signal that below the threshold frequency;
performing crosstalk cancellation based on matrix inversion, wherein a matrix includes ear-related signals for frequencies of the audio signal that are above the threshold frequency;
emitting audio from a pair of stereo speakers of a mobile device, wherein the emitted audio is based, at least in part, on the crosstalk cancellations performed on the obtained audio signal.

13. A non-transitory machine-readable storage medium of claim 12, wherein the obtaining the threshold frequency includes calculating the threshold frequency based, at least in part, on a detected orientation of the mobile device.

14. A non-transitory machine-readable storage medium of claim 12, wherein the threshold frequency is calculated by dividing a speed of sound by twice the determined horizontal spacing.

15. A non-transitory machine-readable storage medium of claim 12, wherein the performance of the crosstalk cancellation with complementary cardioid beams includes:
modifying each of the stereo channels to introduce a time-delay of the other stereo channel;
emitting complementary cardioid sound beams from the pair of speakers, wherein one of the speakers produces sound based on one of the modified stereo channels while the other of the speakers produces sound based on the other of the modified stereo channels.

* * * * *